March 29, 1955  G. N. TERZIEV  2,705,187
MANUFACTURE OF SODIUM SULFIDE AND SULFITE
Filed July 16, 1953
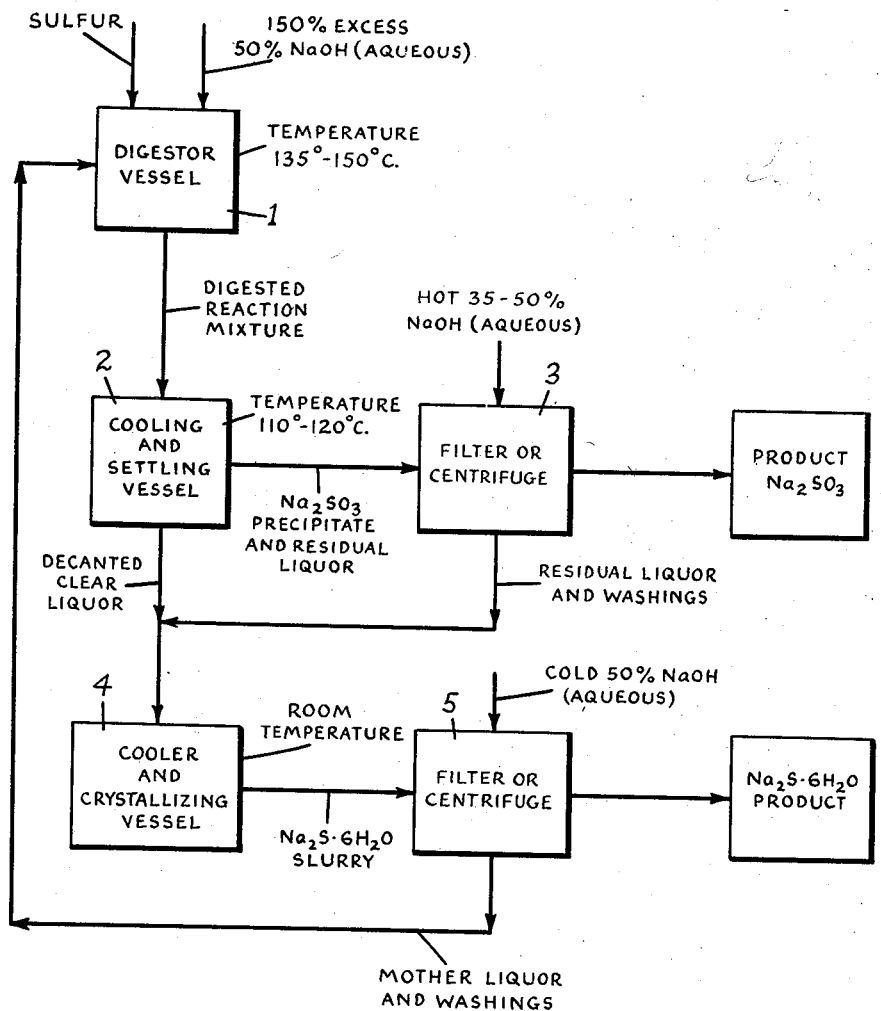
INVENTOR.
GEORGE N. TERZIEV
BY
ATTORNEY.

United States Patent Office 2,705,187
Patented Mar. 29, 1955

2,705,187

MANUFACTURE OF SODIUM SULFIDE AND SULFITE

George N. Terziev, Syracuse, N. Y., assignor to Allied Chemical & Dye Corporation, New York, N. Y., a corporation of New York Application July 16, 1953, Serial No. 368,247

15 Claims. (Cl. 23—129)

This invention relates to production of sodium sulfide and sulfite, and deals particularly with novel procedure for the manufacture of these compounds.

It is known to react sulfur with caustic soda solution to form sodium polysulfides as disclosed, for example, in U. S. P. 1,934,626. It is also known to form sodium sulfide and sulfite by heating and reacting sulfur with caustic soda. Thus, in accordance with U. S. P. 1,068,769, a mixture consisting of equal weights of sulfur and caustic soda is heated at about 212° F., the temperature rising as water is evaporated, to form a solid reaction product containing, exclusive of about 15% combined water, about 37% free sulfur, 11% sodium thiosulfate, 28% sodium sulfide, 8% sodium sulfite and less than 1% sodium hydroxide. It is apparent that only a minor portion of the final product produced by the process of this patent consists of sodium sulfide and sulfite, the major portion of such product being composed of free sulfur and sodium thiosulfate. However, I am aware of no prior art process for reacting sulfur with caustic soda for the manufacture of high purity sodium sulfide and sulfite with substantial exclusion of the formation of other sulfur containing products.

An appreciable market exists for high purity sodium sulfide, which may be used as a depilatory, in the manufacture of sulfur dyes and, in solution, as a solvent for such dyes, and for other purposes. Sodium sulfite may be used in semi-chemical cooking of wood pulps, in solution as a gentle bleaching agent for wool and silk and as an antichlor after bleaching yarns, cloths or paper pulp with chlorine, and also finds application in medicine, e. g, as an antiseptic, and in photography for the preparation of photographic developers.

Accordingly, one object of this invention is to produce sodium sulfide and sulfite. Another object is the provision of procedure for the preparation of sodium sulfide and sulfite by reaction of sulfur with caustic soda. A particular aim of the invention is to provide a relatively simple process for digesting sulfur in caustic soda so as to produce practically quantitative conversion of the sulfur to high purity sodium sulfide, essentially in the hydrate form $Na_2S.6H_2O$, and anhydrous sodium sulfite to the exclusion of practically all other products except water formed by the reaction. Other objects and advantages will appear as the description of the invention set out below proceeds.

In pursuance of the aforementioned objects, I have discovered that sulfur and caustic soda in aqueous solution react under certain hereinafter defined conditions, particularly as to temperature and caustic concentration, to produce substantially only sodium sulfide and sulfite and a very minor proportion of other sulfur bearing products, essentially in the form of sodium polysulfides.

The invention accordingly briefly involves production of sodium sulfide and sulfite by reacting sulfur with an aqueous sodium hydroxide solution in a proportion of 2 mols of sodium hydroxide per atomic weight of sulfur at approximately the boiling temperature of the mixture, employing a substantial excess of sodium hydroxide. The main reaction taking place is illustrated by the equation below:

$$6NaOH + 3S \rightarrow 2Na_2S + Na_2SO_3 + 3H_2O$$

It is apparent from the above equation that by practice of my process under the conditions more fully described hereinafter, essentially two thirds of the sulfur and caustic soda are converted to sodium sulfide and one third to sodium sulfite, and both of these materials are readily separable from the reaction mass in high purity and in practically quantitative proportions. Only a very minor amount of by-product in the form of sodium polysulfides is thereby produced, and furthermore, this material is readily prevented from contaminating the sodium sulfide and sulfite products hereof during their separation in the manner set forth below, and such polysulfides also act to facilitate the sulfur-caustic soda reaction.

The invention is generally carried out by digesting sulfur in 45-52% aqueous sodium hydroxide at the boiling temperature of the mixture, which is between 130° and 150° C., employing 50-200% excess sodium hydroxide solution. In preferred operation aqueous sodium hydroxide solution of about 50% strength is used in 75-200% excess, and the temperature of digestion substantially ranges from about 135° to about 150° C. The digestion reaction is made to proceed for a time sufficient to cause 2 mols of sodium hydroxide to react per atomic weight of sulfur, in accordance with the above equation, and to boil off a substantial proportion of water, thereby precipitating out sodium sulfite and leaving sodium sulfide formed in solution. The sodium sulfide and sulfite are then recovered from the reaction mixture by cooling and separating out the solid sodium sulfite, in anhydrous form, cooling the remaining liquor further to crystallize out sodium sulfide, usually as the hexahydrate $Na_2S.6H_2O$, and removing mother liquor, essentially an aqueous sodium hydroxide solution containing a small amount of polysulfides, which liquor may be recycled for use in a succeeding digestion operation.

It is important in carrying out the digestion operation that an excess of sodium hydroxide solution be present and that the aforementioned high temperatures at about the boiling point of the reaction mixture be maintained. If the temperature of reaction is low and/or excess sulfur is present, the reaction illustrated by the above equation is accompanied by side reactions in which substantial amounts of undesired by-products, e. g. sodium polysulfides and thiosulfate, are produced. When carrying out a cyclic process in accordance with the invention principles, formation of polysulfides is slight; for instance, after the first cycle polysulfides present may correspond to 16% of the initial sulfur introduced, whereas after the fifth cycle the amount of polysulfides present usually is less than 3% of the total sulfur which has been introduced up to that point and drops to 2% and lower in succeeding cycles.

This small amount of sodium polysulfides in solution during digestion is believed to facilitate solution of the sulfur and its reaction with NaOH. Actually, sulfur in the form of sodium polysulfides acts very much like free sulfur in soluble form. Further, in cyclic operations where a part or all of the caustic soda liquor employed for digestion constitutes mother liquor from a preceding digestion and contains small amounts of dissolved sodium polysulfides, the presence of the latter tends to minimize further formation of polysulfides in the reaction.

The use in the reaction mixture of a substantial excess (generally 50-200%) of caustic soda solution is also important, particularly from the standpoint of recovery and separation of the sodium sulfide following removal of sodium sulfite. The excess caustic liquor serves as a fluid medium in which crystals of the sodium sulfide may be freely formed and from which they can be readily separated by filtration and/or centrifuging. If insufficient excess caustic liquor is present to suspend these crystals and afford a fluid mixture which can be handled readily, all of the components of the liquor at this stage of the process, including sodium sulfide, sodium hydroxide and sodium polysulfides, will solidify on cooling into a solid mixture. Additionally, the excess caustic liquor provides a means for removing all polysulfides from the sodium sulfide crystals, since sodium polysulfides are highly soluble in the excess caustic liquor at the low (about room) temperature at which the sodium sulfide is crystallized therefrom, and hence remain in solution in the final mother liquor.

In commercial operation of the instant process sodium hydroxide solution of 45–52% strength, preferably about 50% solutions, are utilized for the reason first that the solubility of sodium sulfide in cold NaOH liquors having the foregoing concentrations and from which the sodium sulfide is crystallized in accordance with the invention principles, is very small and thus the sodium sulfide crystals may be obtained almost quantitatively at the low crystallization temperatures employed herein, and what little sulfide the mother liquor holds after removal of sodium sulfide crystals is in the form of the highly soluble sodium polysulfides. Secondly, the 45–52% caustic liquor acts as a dehydrating agent up to a certain point, i. e. it prevents sodium sulfide from crystallizing as $Na_2S.9H_2O$ and permits it to appropriate just enough water to form essentially $Na_2S.6H_2O$, one of the two desired products thereof. Under these conditions both the $Na_2S.6H_2O$ and the 45–52% caustic liquor resist removal of their water contents, which is conducive to crystallization of the sought-for sodium sulfide hexahydrate.

Assume, for convenience and clarity in further describing the invention in accordance with a preferred embodiment thereof, that sulfur is added to an aqueous 50% caustic soda solution present say in 150% excess. Considerable heat is developed in the digestion reaction which is quickly brought to the boiling point of the mixture at 135° C. The reaction continues at the boiling temperature of the mixture which gradually rises as water is boiled off. The reaction proceeds vigorously under these conditions usually with continuous precipitation of sodium sulfite as the reaction progresses, since sodium sulfite is almost totally insoluble in 50% NaOH liquor or a composite liquor consisting essentially of 50% aqueous NaOH and $Na_2S$. The reaction is allowed to continue until, through loss of water, the boiling point reaches say about 140–150° C., at which point the digestion reaction ordinarily is essentially complete with substantially all of the sodium sulfite, amounting to almost 1 mol for every 6 mols of sodium hydroxide reacted, precipitated out in anhydrous form. The digestion reaction may be completed in a short period of time as little as 15 minutes or less.

When the reaction taking place reaches completion at 140–150° C., a substantial proportion of water has been boiled off, generally an amount between 25% and 75% of the sum of weight of water formed in the reaction plus the weight of sodium hydroxide reacted. Operating at 140° C., I have found that the remaining digesting liquor contains just about sufficient water to supply the excess caustic soda with the content of water necessary to make 50% NaOH solution and enough more to provide the sodium sulfide subsequently crystallized therefrom, with its six molecules of water of hydration. Sodium sulfide is highly soluble in the hot NaOH solutions of 45–52% strength employed herein, and accordingly remains in solution along with the small amount of sodium polysulfides also formed in the reaction.

In some instances, and for reasons presently not fully known to me, precipitation of sodium sulfite does not always take place immediately during the above digestion period. I surmise this may be due to conditions of supersaturation in the solution. Under these circumstances, where the 50% NaOH solution of the preferred embodiment is used for digestion, it is usually necessary to subject the liquor to gentle boiling for about one hour or so up to say 140–150° C., and if this does not result in complete precipitation of the sodium sulfite, the liquor may then be refluxed within the last mentioned temperature range to bring down the sulfite. The time for digestion and reaction in the instant process accordingly ranges from about ¼ to 1½ hours depending upon the ease with which the anhydrous sodium sulfite is precipitated.

The hot reaction mixture following the digestion reaction, essentially comprising an aqueous solution of sodium hydroxide and sodium sulfide having also dissolved therein a minor amount of sodium polysulfides and containing solid anhydrous sodium sulfite in suspension, is then cooled from about the boiling point of the mixture to 110–120° C., during which period the sodium sulfite rapidly settles. After the reaction mixture has been cooled down to the aforementioned temperature and settled, most of the clear liquor is decanted and the solid sodium sulfite and residual liquor mixture is filtered or centrifuged hot (110–120° C.) to recover anhydrous sulfite as product. This product is then washed several times with small increments of fresh about 35%–50% hot aqueous sodium hydroxide solution to wash out adhering sodium sulfide. A final wash with a spray of water or methyl alcohol can be applied to remove adhering NaOH.

The decanted liquor is then combined with the filtrate and the hot NaOH wash liquors, and the resulting solution is cooled to about room temperature (20° C.) to crystallize out sodium sulfide in the form of $Na_2S.6H_2O$. The mixture obtained is then filtered or centrifuged (or both) to separate mother liquor from crystals of $Na_2S.6H_2O$, and the crystals are washed with small increments of fresh about 50% cold sodium hydroxide solution to remove adhering mother liquor and obtain $Na_2S.6H_2O$ crystals analyzing about 42% $Na_2S$ and of minimum NaOH content.

The mother liquor separated from the $Na_2S.6H_2O$ crystals and the cold 50% NaOH wash liquors are combined. Where the final boiling point of the digest liquor does not exceed 140° C. using 50% NaOH solution for digestion and washing of precipitates, the final combined mother liquor contains about 50% sodium hydroxide and also contains a small quantity of sodium polysulfides. Hence, the final mother liquor, to all intents and purposes, constitutes substantially the original excess 50% NaOH liquor plus the 50% NaOH wash liquors. This mother liquor may then be recycled for digestion of additional sulfur. In so doing, sufficient fresh 50% sodium hydroxide solution may be added to the mother liquor to obtain the desired excess, e. g. 150%, sodium hydroxide based on the amount of sulfur to be digested, or such mother liquor may be used for digestion without addition thereto of fresh 50% NaOH solution where the amount of washings combined with the original excess NaOH liquor from digestion has restored the required sodium hydroxide excess for the amount of sulfur to be digested in the succeeding operation.

As an important feature of the invention, I have found that the final mother liquor may be employed over and over in succeeding cycles of sulfur digestion for obtaining anhydrous sodium sulfite and sodium sulfide ($Na_2S.6H_2O$), in accordance with the invention principles without loss in efficiency. The reason for this is that on recycling, less polysulfides are formed during digestion in a succeeding cycle until polysulfide formation reaches equilibrium and hence in subsequent cycles no more polysulfides are produced. The mother liquor has been found to reach this maximum relatively low concentration of polysulfides after only about 3 cycles, and thereafter practically no additional polysulfides are produced and virtually quantitative yields of the desired products are accordingly realized.

In the preferred embodiment of the invention employing 50% sodium hydroxide solution for digestion, the reaction mixture is heated to about 150° C. during digestion to insure virtually complete precipitation of the sulfite. In this case, more water is boiled off than just sufficient to leave the excess caustic soda with the water content required to make 50% NaOH and enough more to provide the subsequently crystallized sodium sulfide with its six molecules of water of hydration. While additional water can be added to the digested mixture for this purpose, the preferred practice is to use somewhat more dilute sodium hydroxide solutions, e. g. about 35% strength, to wash the sodium sulfite precipitate, then to combine the washings with the excess NaOH liquor from the digestion operation to bring the final mother liquor up to the desired 50% concentration for use in the next cycle. Use of about 35% sodium hydroxide wash solution permits a highly efficient washing of the sodium sulfite precipitate.

However, the invention can be generally carried out using 45–52% aqueous sodium hydroxide solutions for digestion and the caustic soda wash solution employed in recovery of the sodium sulfite product hereof can also vary in strength from 35 to 52% in order to form the hexahydrate of sodium sulfide and to produce a final mother liquor of 45–52% NaOH strength. Within these limits the process of the invention is applicable to production of sodium sulfite and sulfide products in practically quantitative proportions with formation of only minor amounts of polysulfides, and such products may be easily separated and recovered in accordance with the invention principles.

I have found that the operations of my invention, particularly the digestion operation, are best carried out in vessels lined with corrosion resistant materials, e. g. "Hastelloy B" and "Inconel" metal. While stainless steel and glass lined vessels are restraint to attack by the cold cautstic liquors of the invention, they are attacked by the hot caustic liquors utilized in my process and hence are not suitable for use in, for example, the digestion operation hereof.

The following examples are set forth as an aid to a better understanding of the invention, all quantities recited being expressed in parts by weight:

*Example 1.*—The operations of this example are described particularly in relation to the flow sheet shown in the accompanying drawing in order to more clearly illustrate the invention process.

A series of runs are made as hereinafter described, each run commencing with the charging of 96 parts of elemental sulfur and 1200 parts of 50% sodium hydroxide solution to digestor vessel 1. In the first run the digestion is accomplished with a fresh caustic soda solution. In each succeeding run the digestion is accomplished with the combined recycled mother liquor and washings separated from the sodium sulfide product crystals and made up to the original caustic soda solution volume by addition of a small amount of 50% sodium hydroxide solution.

In accordance with the digestion reaction illustrated in the equation above, the amount of caustic soda solution charged to the digestor in relation to the quantity of sulfur employed, constitutes about a 150% excess of sodium hydroxide. The sulfur reacts readily with the sodium hydroxide, developing considerable heat of reaction, and the temperature of the reaction mixture is quickly raised to its boiling point of about 135° C. Sodium sulfite commences to precipitate out of the mixture almost as soon as the reaction begins. The digestion reaction proceeds with vigor at the boiling point of the mixture and as water is boiled off, the temperature gradually rises. During the reaction period, sodium sulfite continues to drop out of solution and the digestion reaction is complete when the temperature reaches about 140° C. At this point, although some water is generated in the reaction, about 80 parts of water are boiled off during each digestion so that the water content of the final reaction mixture is just sufficient to leave the excess sodium hydroxide present as 50% liquor and to supply 6 mols of water for each mol of sodium sulfide formed and present in solution in such final mixture. The digestion reaction takes place in about 15 minutes.

The digested reaction mixture comprising about 50% sodium hydroxide solution, sodium sulfite precipitate, dissolved sodium sulfide and a small amount of sodium polysulfides formed in the reaction, is then cooled to 110–120° C. in a cooling and settling vessel 2, wherein the mixture rapidly settles during the cooling period. Most of the clear liquor is then decanted and the precipitate of sodium sulfite and residual liquor is then passed to a filter or centrifuge 3, after which the sodium sulfite is washed several times with small quantities of fresh hot 50% sodium hydroxide solution to obtain an average of 122 parts of final anhydrous sodium sulfite product per run, corresponding to a yield of 97% of theory based on the sulfur employed.

The filtrate and the sodium sulfite washings are then combined with the decanted liquor to form a solution of substantially 50% NaOH, sodium sulfide and some polysulfides, and the resulting solution is then passed to a cooler and crystallizer vessel 4 wherein the solution is cooled to room temperature to crystallize out sodium sulfide as $Na_2S.6H_2O$. The mixture is then conducted to a filter or centrifuge 5 and the crystals recovered therefrom are washed with small installments of fresh cold 50% sodium hydroxide solution to obtain an average of about 360 parts of final $Na_2S.6H_2O$ product per run, corresponding to a yield of 97% of theory based on sulfur. The filtrate and washings separated from the sodium sulfide product are then combined, and the resulting solution containing about 50% sodium hydroxide is then recycled to digestor 1 for use in a succeeding operation. Concentration of sodium polysulfides in the solution recycled for digestion remains about 25 grams per liter throughout the operation.

*Example 2.*—The process is carried out with the same quantities of reactants as used in Example 1 and in a manner similar to Example 1 except that the digestion is prolonged until the boiling point of the mixture rises to 150° C. At this point the water content of the mixture is insufficient to supply 6 mols of water for each mol of sodium sulfide formed and yet to leave the excess sodium hydroxide present as a 50% liquor. To compensate for the extra evaporation, thus to reconstitute essentially the excess sodium hydroxide present as a 50% liquor after $Na_2S.6H_2O$ crystallization, a total of about 393 parts of fresh hot 35% sodium hydroxide solution is used to wash the separated sulfite precipitate, and the washings are combined with the sodium sulfide-sodium hydroxide mother liquor prior to crystallizing of the sulfide product as the hexahydrate. Based on the sulfur employed, the yields of sodium sulfite and sodium sulfide are essentially the same as those obtained in Example 1.

*Example 3.*—96 parts of sulfur and about 1125 parts of 50% sodium hydroxide solution, corresponding to about a 135% excess thereof, are mixed and the temperature raised to 135° C., approximately the boiling point of the mixture. Since sodium sulfite fails to precipitate after digestion for about 15 minutes, the mixture is boiled gently for one hour at a temperature not exceeding 140° C., at the end of which time sodium sulfite precipitates out.

The mixture is then allowed to cool to 120° C. and is settled in a period of about ½ hour. The clear liquor is decanted, and precipitated sodium sulfite and residual liquor are filtered quickly and washed with several small increments, not exceeding a total of about 150 parts, of fresh hot 50% sodium hydroxide liquor. The washed sodium sulfite is then given a final spray of methyl alcohol to wash out adhering sodium hydroxide.

The decanted liquor is combined with the filtrate and the caustic soda liquor washings, and the combined solution is cooled to room temperature and the $Na_2S.6H_2O$ content thereof crystallized. The crystal-liquor mass is filtered and the crystals washed with fresh cold 50% sodium hydroxide solution.

The filtrate and washings from the previous operation are combined with the main bulk of mother liquor and to this combined solution consisting essentially of 50% sodium hydroxide solution plus a small quantity of dissolved polysulfides, is added additional fresh 50% sodium hydroxide liquor sufficient to again form 1125 parts of an essentially 50% caustic soda solution as at the beginning. About 96 parts of sulfur are then added to this solution and the digestion and the sodium sulfite and sulfide recovery operations set forth above repeated. Five cycles of operation are carried out in this manner, recycling the mother liquor at the end of each cycle. From the five cycles of operation, a total of 630 parts of anhydrous sodium sulfite and about 1790 parts of $Na_2S.6H_2O$ are obtained, amounting to a practically quantitative yield of sodium sulfite and about a 96% yield of $Na_2S.6H_2O$, based on the consumption of sulfur. The mother liquor at the end of the fifth cycle contains about 25 grams per liter of dissolved sodium polysulfides.

From the foregoing, it is apparent I have provided a simple process for production of two commercially important products, sodium sulfide and sulfite, in practically quantitative yields from sulfur and caustic soda as starting materials, wherein substantially the entire amount of sulfur employed is converted to these products and the excess caustic soda can be recycled with essentially no loss of this material in the process. The invention process can be of particular value in localities where hydrogen sulfide and sulfur dioxide are not readily obtainable for reaction of these materials with caustic soda to produce sodium sulfide and sodium sulfite, respectively.

Since various changes and modifications may be made in the invention without departing from the spirit thereof, the invention is to be taken as limited only by the scope of the appended claims.

I claim:

1. The process of producing sodium sulfide and sodium sulfite which comprises reacting sulfur with an aqueous sodium hydroxide solution in a proportion of 2 mols of sodium hydroxide per atomic weight of sulfur at approximately the boiling temperature of the mixture, employing a substantial excess of sodium hydroxide and maintaining said temperature for a time sufficient to boil off a substantial proportion of water, and to raise the boiling point of the mixture to about 140° C.–150° C., thereby precipitating out sodium sulfite and leaving sodium sulfide formed in solution, cooling the mixture to a temperature between about 110° C. and about 120° C., and separating the precipitated sodium sulfite from the sodium sulfide-containing mother liquor.

2. The process of producing sodium sulfide and sodium sulfite which comprises reacting sulfur with an aqueous 45–52% sodium hydroxide solution in a proportion of 2 mols of sodium hydroxide per atomic weight of sulfur at a temperature between 130 and 150° C., employing a substantial excess of said sodium hydroxide solution and maintaining said temperature for a time sufficient to boil off a substantial proportion of water, and to raise the boiling point of the mixture to about 140° C.–150° C., thereby precipitating out sodium sulfite and leaving sodium sulfide formed in solution, cooling the mixture to a temperature between about 110° C. and about 120° C., and separating the precipitated sodium sulfite from the sodium sulfide-containing mother liquor.

3. The process as defined in claim 2 wherein said aqueous sodium hydroxide solution is employed in 50–200% excess and a small amount of sodium polysulfides is present in the reaction mixture.

4. The process as defined in claim 3 wherein said aqueous sodium hydroxide solution is about 50% strength and substantially quantitative yields of sodium sulfide and sodium sulfite are obtained.

5. The process of producing sodium sulfide and sodium sulfite which comprises digesting sulfur in 45–52% aqueous sodium hydroxide solution at a temperature between 130 and 150° C. for a time sufficient to cause 2 mols of sodium hydroxide to react per atomic weight of sulfur and to boil off a substantial proportion of water, 50–200% excess sodium hydroxide solution being employed, thereby precipitating out sodium sulfite and leaving sodium sulfide formed in solution, and recovering sodium sulfide and sodium sulfite from the reaction mixture in substantially quantitative yields.

6. The process as defined in claim 5 wherein digestion is initiated in aqueous sodium hydroxide solution of about 50% strength and the temperature of digestion substantially ranges from about 135–150° C.

7. The process as defined in claim 5 wherein said sodium sulfite and sodium sulfide are separated from liquor containing sodium polysulfide in said reaction mixture and said liquor is recycled for use in a succeeding digestion operation.

8. The process as defined in claim 7 wherein said time for digestion and reaction ranges from about ¼ to 1½ hours.

9. The process as defined in claim 5 wherein said sodium sulfide and sodium sulfite are recovered from the reaction mixture by cooling said mixture to 110–120° C., settling the sodium sulfite precipitate, decanting the liquor containing dissolved sodium sulfide, removing residual liquor from said precipitate, washing said precipitate with 35–52% hot sodium hydroxide solution combining the decanted liquor with said residual liquor and said washings, cooling the resulting solution to about room temperature to crystallize out sodium sulfide, separating mother liquor from said crystals and washing said crystals with 45–52% cold sodium hydroxide solution.

10. The process of producing sodium sulfide and sodium sulfite which comprises digesting sulfur in about 50% aqueous sodium hydroxide solution at a temperature between 130 and 150° C. for from about ¼ to 1½ hours to cause 2 mols of sodium hydroxide to react per atomic weight of sulfur and to boil off an amount of water between about 25% and 75% of the sum of weight of water formed in the reaction plus the weight of sodium hydroxide reacted, 75–200% excess sodium hydroxide solution being employed, thereby precipitating out almost 1 mol of sodium sulfite for every 6 mols of sodium hydroxide reacted and leaving in solution almost 2 mols of sodium sulfide formed for every 6 mols of sodium hydroxide reacted and a small amount of sodium polysulfides, cooling the reaction mixture to 110–120° C., separating sodium sulfite precipitate from residual liquor containing dissolved sodium sulfide, washing said precipitate with about 35–50% hot sodium hydroxide solution to remove adhering sodium sulfide, cooling the residual liquor to about room temperature to crystallize out $Na_2S \cdot 6H_2O$, separating mother liquor from said crystals, and washing said crystals with about 50% cold sodium hydroxide solution.

11. The process as defined in claim 10 wherein the mother liquor and crystal washings are combined, and this final combined liquor is recycled for use in a succeeding digestion operation.

12. The process of producing sodium sulfide and sodium sulfite which comprises digesting sulfur in about 50% aqueous sodium hydroxide solution at a temperature between 130 and 150° C. for from about ¼ to 1½ hours to cause 2 mols of sodium hydroxide to react per atomic weight of sulfur and to boil off an amount of water between about 25% and 75% of the sum of weight of water formed in the reaction plus the weight of sodium hydroxide reacted, 75–200% excess sodium hydroxide solution being employed, thereby precipitating out almost 1 mol of sodium sulfite for every 6 mols of sodium hydroxide reacted and leaving in solution almost 2 mols of sodium sulfide formed for every 6 mols of sodium hydroxide reacted and a small amount of sodium polysulfides, cooling the reaction mixture to 110–120° C., settling the sodium sulfite precipitate, decanting the liquor containing dissolved sodium sulfide, removing residual liquor from said precipitate, washing said precipitate with about 35–50% hot sodium hydroxide solution to remove adhering sodium sulfide, combining the decanted liquor with said residual liquor and said washings, cooling the resulting solution to about room temperature to crystallize out $Na_2S \cdot 6H_2O$, separating mother liquor from said crystals, and washing said crystals with about 50% cold sodium hydroxide solution.

13. The process as defined in claim 12 wherein the mother liquor and crystal washings are combined, and this final combined liquor is recycled for use in a succeeding digestion operation.

14. The process as defined in claim 13 wherein the digestion reaction is prolonged until the boiling point of the mixture rises to about 150° C., and 35% sodium hydroxide solution is used to wash the sodium sulfite precipitate, the amount of said 35% solution being sufficient to reconstitute essentially a 50% sodium hydroxide concentration in the mother liquor remaining after the sulfide crystallization.

15. The process as defined in claim 14 wherein the total amount of sodium hydroxide solution employed for washing both the sodium sulfite precipitate and the $Na_2S \cdot 6H_2O$ crystals is such that the amount of said final combined 50% sodium hydroxide liquor obtained does not exceed that employed in the digestion reaction.

References Cited in the file of this patent

UNITED STATES PATENTS

| | | |
|---|---|---|
| 1,068,769 | Hite | July 29, 1913 |

FOREIGN PATENTS

| | | |
|---|---|---|
| 698,727 | Germany | Nov. 15, 1940 |